United States Patent

Boyd

[11] Patent Number: 5,937,788
[45] Date of Patent: Aug. 17, 1999

[54] BIRD FEEDER WITH ELECTRONIC SQUIRREL DETERRENCE

[75] Inventor: Randall D. Boyd, Knoxville, Tenn.

[73] Assignee: Radio Systems Corporation, Knoxville, Tenn.

[21] Appl. No.: 08/944,607

[22] Filed: Oct. 6, 1997

[51] Int. Cl.⁶ ............................................. A01K 5/00
[52] U.S. Cl. ........................................ 119/57.9; 119/52.3
[58] Field of Search .................. 119/52.2, 53.5, 119/57.8, 57.9, 63, 523

[56] References Cited

U.S. PATENT DOCUMENTS

| | | | |
|---|---|---|---|
| 1,005,071 | 10/1911 | Randall . | |
| 1,222,389 | 4/1917 | Goelzer . | |
| 2,884,899 | 5/1959 | Jackes . | |
| 3,568,641 | 3/1971 | Kilham . | |
| 4,188,913 | 2/1980 | Earl et al. | 119/57.9 |
| 4,259,927 | 4/1981 | Clarke | 119/57.9 |
| 4,327,669 | 5/1982 | Blasbalg | 119/57.8 |
| 4,811,694 | 3/1989 | Holmquist | 119/52.2 |
| 5,150,665 | 9/1992 | Boaz | 119/52.3 |
| 5,191,857 | 3/1993 | Boaz | 119/57.9 |
| 5,285,747 | 2/1994 | Caldine | 119/57.9 |
| 5,392,732 | 2/1995 | Fry | 119/57.9 |
| 5,471,951 | 12/1995 | Collins | 119/57.9 |
| 5,517,177 | 5/1996 | Cantrall | 340/571 |

Primary Examiner—Michael J. Carone
Assistant Examiner—Elizabeth Shaw
Attorney, Agent, or Firm—Pitts & Brittian, P.C.

[57] ABSTRACT

A bird feeder with electronic squirrel deterrence that includes a base, a top, a swivelling hanger, a reservoir for storing bird feed and a plurality of feeding holes disposed in the reservoir. Conductive feeding roosts are received in the feeding holes and inserts, having selectively sized beak openings and selectively sized feed baffles are received by the feeding roosts in order to accommodate birds of various species. Further, the base and the top include conductive surfaces. The feeding roosts and the conductive surfaces on the top and the base are in an electronic network that forms an open circuit. The circuit is closed when an animal such as a squirrel makes contact with the conductive surfaces and one of the feeding roosts and delivers a mild electrical shock to the animal. In the preferred embodiment, the top has a plurality of conductive surfaces that form an open circuit that are selectively spaced such that a squirrel at rest on the top closes the circuit and is subsequently shocked while at rest on the top.

17 Claims, 7 Drawing Sheets

BIRD FEEDER WITH ELECTRONIC SQUIRREL DETERRENCE

TECHNICAL FIELD

This invention relates to the field of bird feeders. More particularly, it relates to a bird feeder designed so as to prevent squirrels from feeding therefrom.

BACKGROUND ART

Wild bird feeding, via the hanging of bird feeders, has become a popular hobby activity. Bird feeders are often strategically placed so as to attract various species of birds to a spot that can be conveniently observed. Indeed, more often than not, the provider of the bird feeder is more motivated by observing the birds than by simply providing wild creatures an alternate and convenient food source. For this reason, most bird enthusiasts generally prefer to provide feed for birds rather than other, larger, animals. And, because of its voracious appetite, the squirrel is the bane of most bird-feeding enthusiasts. The art is replete with feeders that have attempted to prevent squirrels from stealing the bird seed. However, the squirrel has displayed a remarkable ability to foil efforts at preventing it from obtaining a free meal. For instance, it has been observed that a squirrel will approach a feeder from the top and hang upside down from the top in order to feed. U.S. Pat. No. 5,150,665, issued to Boaz on Sep. 29, 1992, discloses a bird feeder that has a curved top intended to make it difficult for a squirrel to rest on the top and that incorporates an electrical circuit designed to provide a mild, non-injuring shock to a squirrel in order to discourage the squirrel from feeding.

Other known bird feeders in this art, of which the inventor is aware, include U.S. Pat. No. 1,005,071, issued to Randall on Oct. 3, 1911; U.S. Pat. No. 1,222,369, issued to Goelzer on Apr. 10, 1917; U.S. Pat. No. 2,884,899, issued to Jackes on May 5, 1959; U.S. Pat. No. 3,568,641, issued to Kilham on Mar. 9, 1971; U.S. Pat. No. 4,188,913, issued to Earl et al. on Feb. 19, 1980; U.S. Pat. No. 4,259,927, issued to Clarke on Apr. 7, 1981; and, U.S. Pat. No. 4,327,669, issued to Blasbalg on May 4, 1982. What has been missing from the art is a squirrel proof bird feeder that includes selectively sized inserts to selectively accommodate birds of various sizes and that includes a plurality of electrodes for providing a mild, non-injurious electrical shock to a squirrel attempting to feed while holding on to any of the various surfaces on the bird feeder and that positively discourages a squirrel from resting on the top via a mild electric shock.

Accordingly, it is an object of the present invention to provide a bird feeder that prevents squirrels from feeding therefrom by providing a plurality of electrodes that provide a mild, non-injuring shock to the squirrel.

Another object of the present invention is to provide a bird feeder having a top that includes electrodes in order to prevent the squirrel from resting on the top of the feeder.

A further object of the present invention is to provide a bird feeder that includes a plurality of inserts having selectively sized openings to optionally accommodate birds of various species at a single feeder.

Still another object of the present invention is to provide a bird feeder that has a hanger/handle and top adapted such that when the top is affixed to the bird feeder the handle is prevented from swivelling and when the top is lifted, the handle and top swivel away from the open end so as to facilitate refilling.

Yet another object of the present invention is to provide a bird feeder that prevents squirrels from feeding therefrom by producing a loud ultrasonic sound that is irritating to squirrels and yet unoffensive to birds.

Other objects and advantages over the prior art will become apparent to those skilled in the art upon reading the detailed description together with the drawings as described as follows.

DISCLOSURE OF THE INVENTION

In accordance with the various features of this invention, a bird feeder with electronic squirrel deterrence is provided. The bird feeder includes a base, a top, a swivelling hanger/handle, a reservoir for storing bird feed and a plurality of feeding holes disposed in the sidewalls of the reservoir. Conductive feeding roosts are received in the feeding holes and inserts, having selectively sized beak openings and selectively sized feed baffles are received by the feeding roosts in order to optionally accommodate birds of various species. Further, the base and the top include conductive surfaces. The feeding roosts and the conductive surfaces on the top and the base are in an electronic network that forms an open circuit. The circuit is closed when a squirrel makes contact with the conductive surfaces and one of the feeding roosts and delivers a mild electrical shock to the squirrel. In the preferred embodiment, the top has a plurality of conductive surfaces that form an open circuit that are selectively spaced such that a squirrel at rest on the top closes the circuit and is subsequently shocked while at rest on the top.

An alternate embodiment is also provided. In the alternate embodiment, rather than producing an electrical shock, the bird feeder produces a loud ultrasonic sound to deter squirrels from foraging at the bird feeder. In this regard, switches are provided that are activated by the weight of a squirrel but not by the average-sized bird. Upon detection of a squirrel an electronic circuit, in conjunction with a piezo sounder, produces an ultrasonic sound in the 25 Khz range. In one embodiment, the electrical switches are provided in the perches with the perch being spring biased away from the contact switch.

BEST MODE FOR CARRYING OUT THE INVENTION

Figure 1:
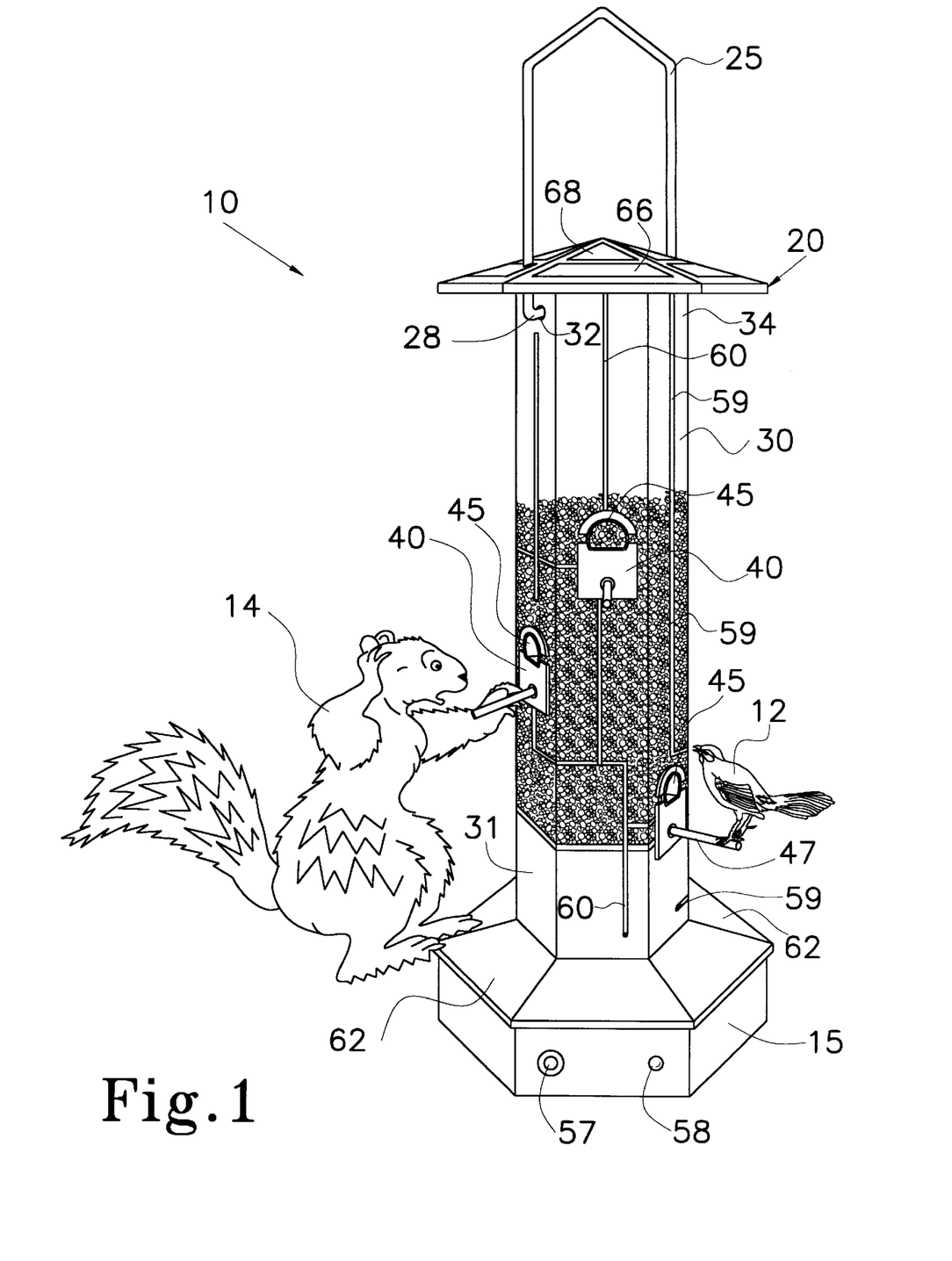
FIG. 1 illustrates a perspective view of the bird feeder of the present invention.

A bird feeder that includes electronic squirrel deterrence, constructed in accordance with the present invention, is illustrated generally as 10 in the figures. Referring to FIG. 1, bird feeder 10 includes a base 15, a top 20, a swivelling hanger/handle 25, a reservoir 30, having an open upper end 34, for storing bird feed and a plurality of feeding holes 35 disposed in the sidewalls of reservoir 30 for holding the bird seed. Reservoir 30 has an upper end 34 and a lower end 31. Conductive feeding roosts 40 are received in feeding holes 35. Inserts 45 have selectively sized beak openings 48 and selectively sized feed baffles 49 and are received by feeding roosts 40 in order to accommodate birds 12 of various species.

Figure 2A:
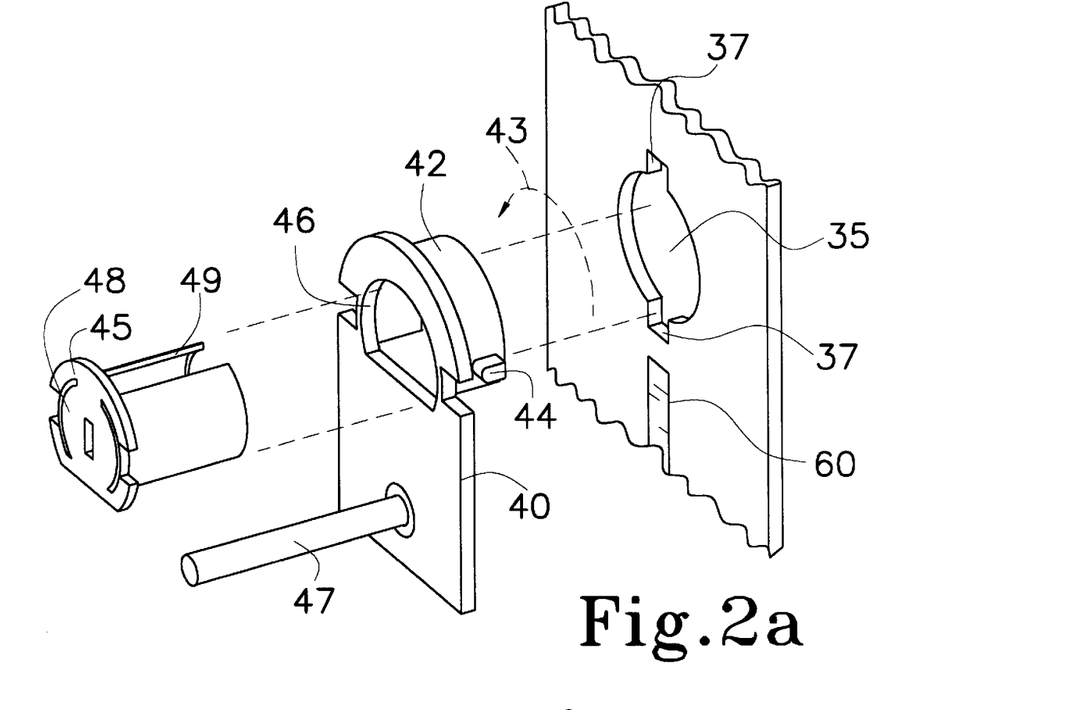
FIGS. 2a and 2b show exploded views of the keyed feed openings with the keyed feeding roosts and species selective inserts with portions of the feeder cut away for clarity.
Figure 2B:
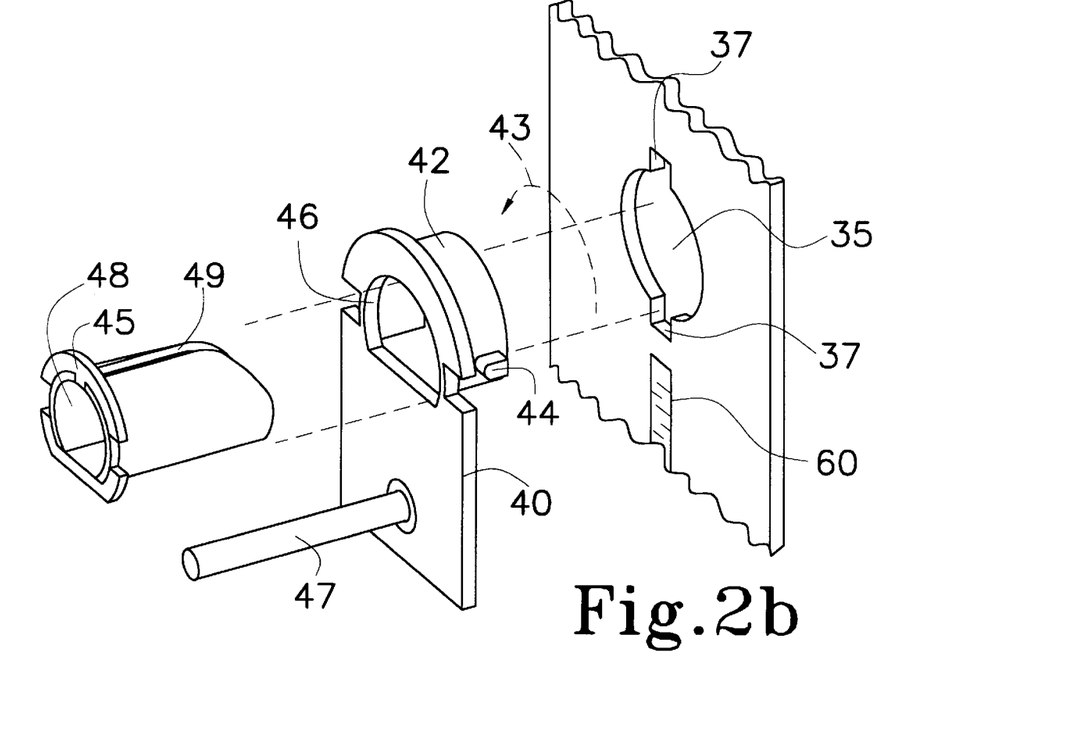

Referring to FIGS. 2a and 2b, more detail of the relationship between feeding hole 35, feeding roost 40 and insert 45 is illustrated. In this regard, feeding roost 40 includes a shoulder 42 having the same geometric configuration as feeding hole 35. Feeding hole 35 and shoulder 42 are dimensioned and configured so as to allow shoulder 42 to be received by feeding hole 35 in a tight, frictional fit and to allow shoulder 42 to rotate within feeding hole 35 as shown by arrow 43. In order to lock feeding roost 40 into place within feeding hole 35, feeding hole 35 is provided with at least one, and preferably two, keyways 37 that register with keys 44 which are disposed upon shoulder 42. To facilitate removal, or insertion, of feeding roost 40 from, or into, feeding hole 35, feeding roost 40 is rotated, as shown by arrow 43, until key 44 registers with keyway 37. Feeding roost 40 is then inserted into feeding hole 35 and rotated back into its normal attitude. Insert 45 is tightly, and frictionally, received by an opening 46 in feeding roost 40. In the preferred embodiment, feeding roost 40 also includes a conductive perch 47.

Figure 4:
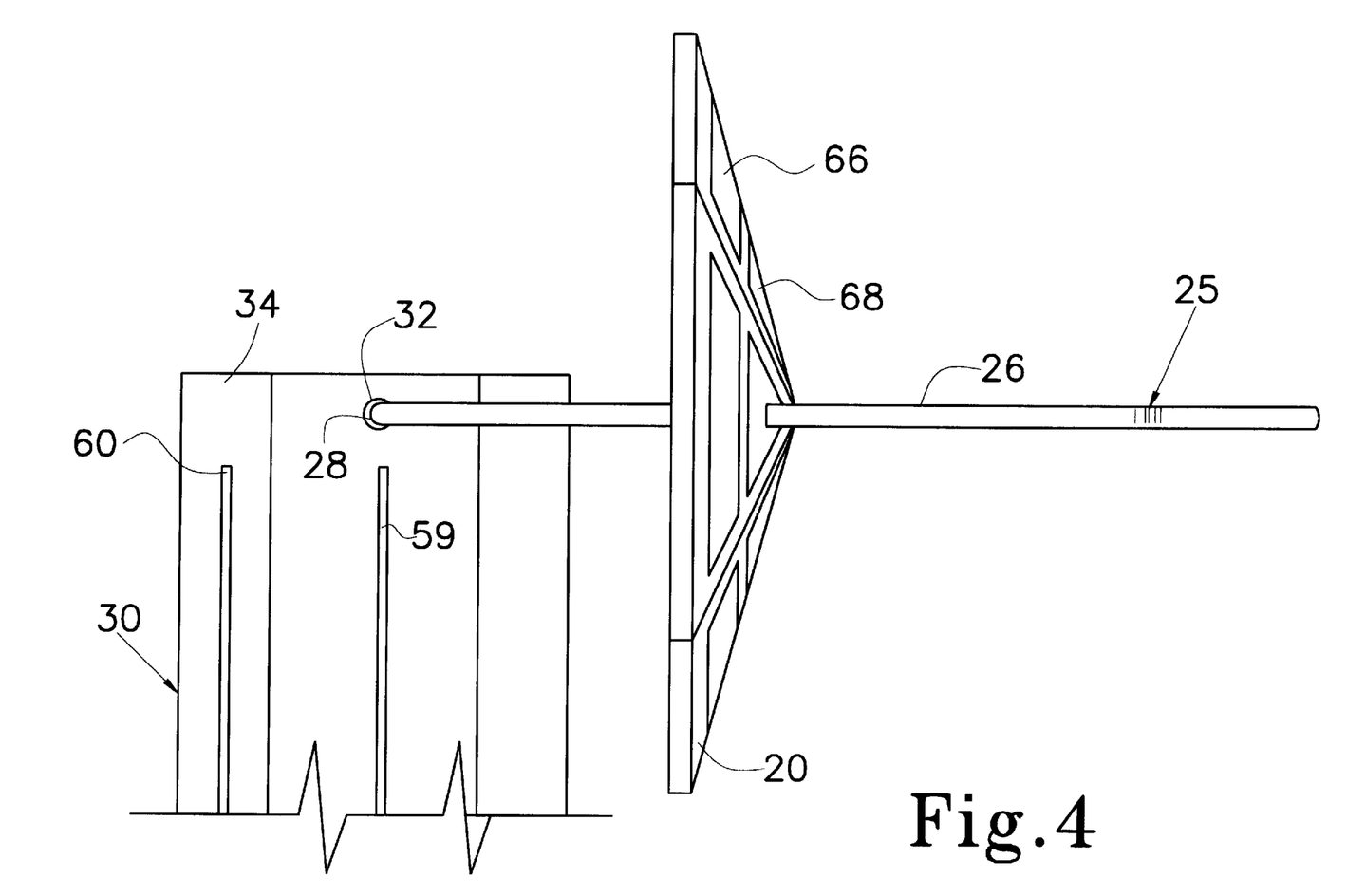
FIG. 4 shows the top of the feeder and the pivotal handle in the open position for filling the bird feeder with portions of the feeder cut away for clarity.
Figure 5:
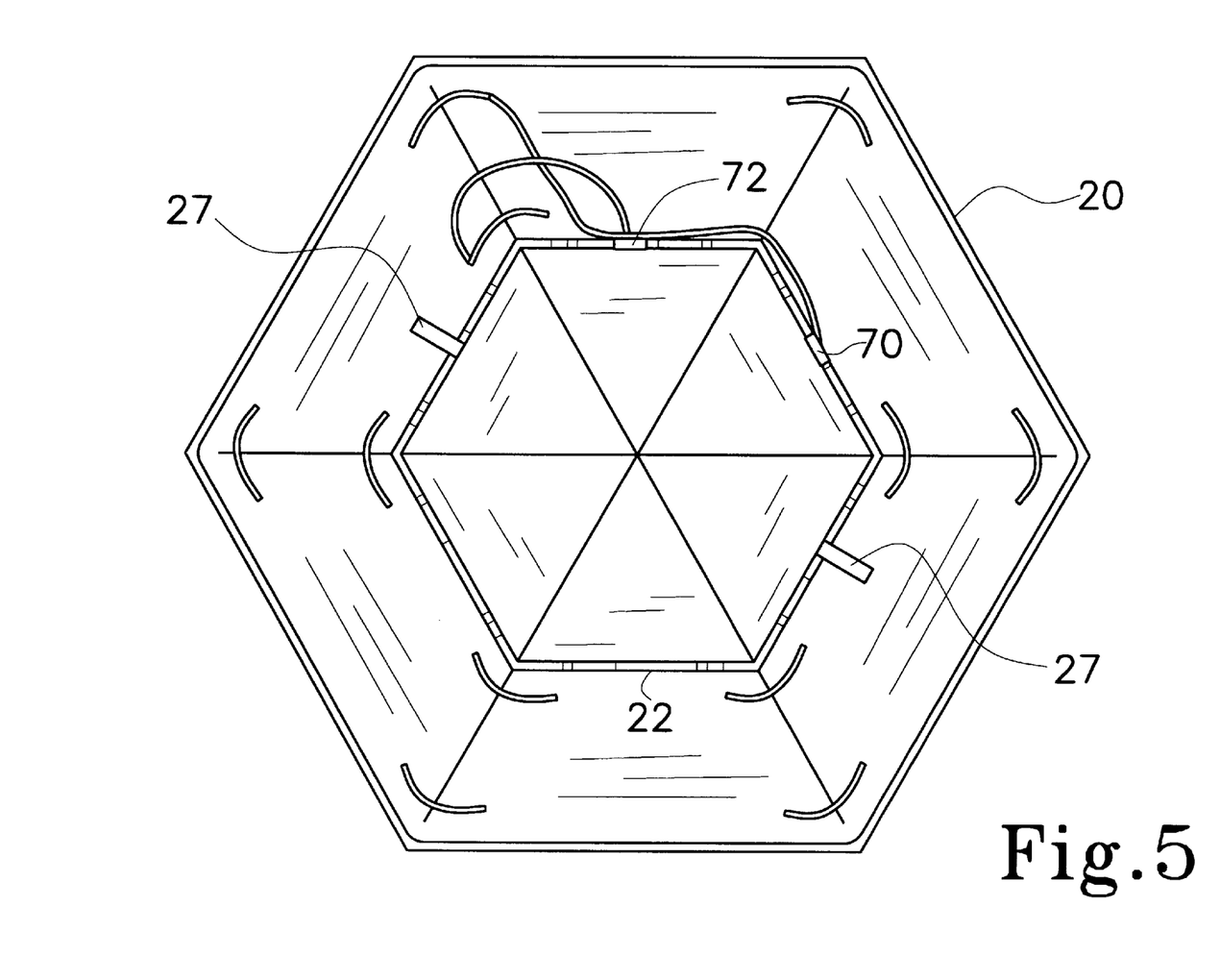
FIG. 5 shows a bottom view of the bird feeder top showing the recess for receiving the top of the bird feeder.

Referring to FIGS. 4 and 5, the top 20 and swiveling handle 25 are illustrated in greater detail. Handle 25 includes vertical members 26 which extend through openings 27 disposed within top 20. Further, as seen in FIG. 1, handle 25 includes lateral segments 28 that engage reservoir 30 and are received in holes 32. Top 20 includes a lip 22 that engages the upper end 34 of reservoir 30 in a tight, frictional engagement that seals the reservoir 30 and substantially protects bird seed stored therein from the elements. In the preferred embodiment, openings 27 are disposed above holes 32 such that when top 20 is positioned on the upper end 34 of the reservoir 30, handle 25 is prevented from rotating. In order to replenish the supply of bird seed in reservoir 30, top 20 is lifted from reservoir 30. This allows handle 25 to swivel around holes 32 at the point of engagement between lateral segment 28 and reservoir 30, to the position illustrated in FIG. 4.

Figures 6, 7:
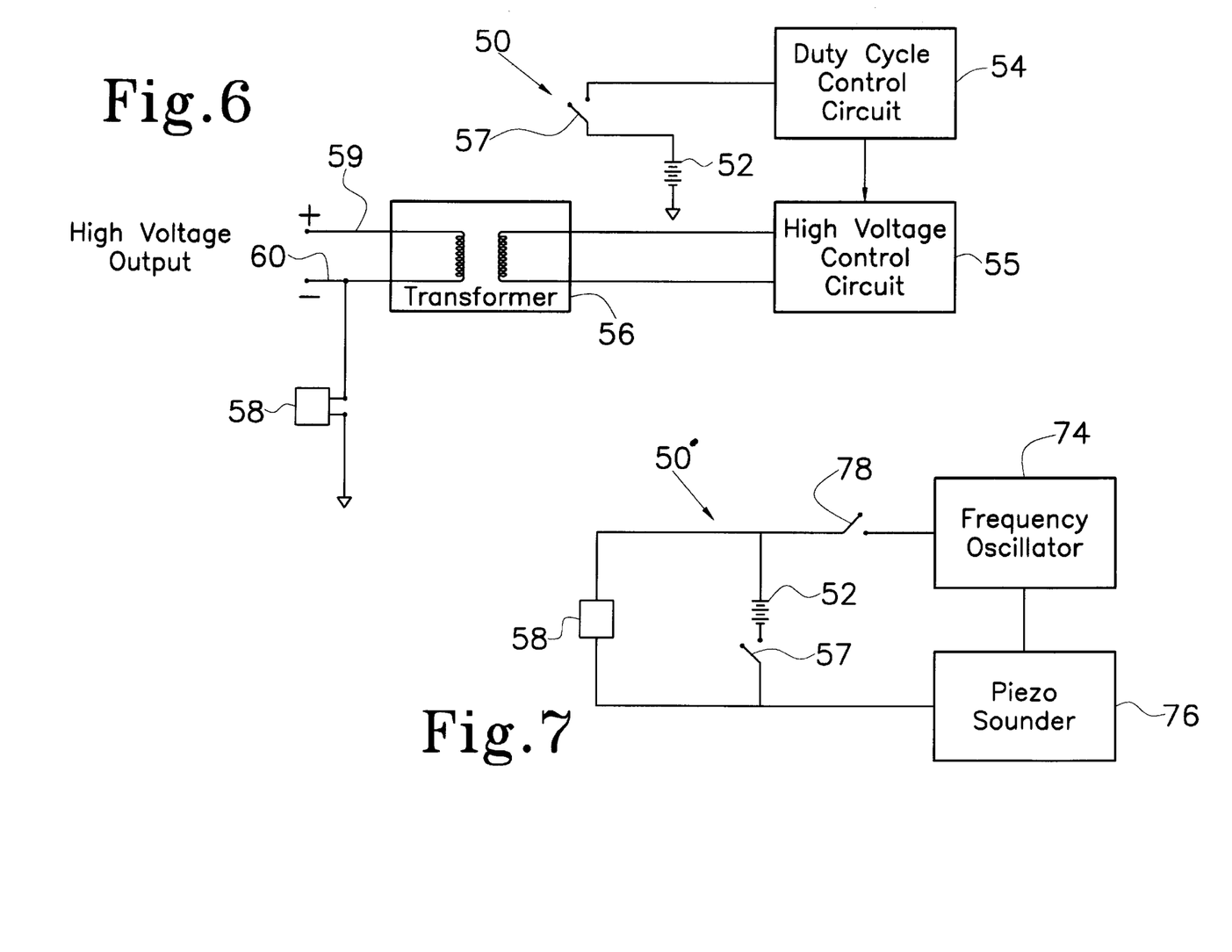
FIG. 6 is a schematic view of the electric circuit that provides the squirrel deterrence by means of electrical shock.
FIG. 7 is a schematic view of the alternate electric circuit that provides the squirrel deterrence by means of producing a loud ultrasonic sound.

Bird feeder 10 also includes an electronic network 50, illustrated in FIG. 6, for preventing larger animals, such as squirrel 14 from robbing feeder 10 of its bird feed. Electronic network 50 is a conventional shocker circuit, known to those skilled in the art, for increasing the voltage of a low voltage, preferably DC, power source such as a battery. The circuitry and the power source are preferably housed in base 15 and can be removed as a unit if in need of repair, thus allowing bird feeder 10 to remain in service should network 50 require repair. Network 50 includes a power source 52, a duty cycle control circuit 54, a high voltage control circuit 55 and a transformer 56. In the preferred embodiment, network 50 also includes a switch 57 and a light 58 for indicating power status to network 50. Current is delivered to the bird feeder via positive lead 59 and negative lead 60. In the preferred embodiment, negative, or ground, lead 60 is in direct electrical connection with each conductive feeding roost 40. Further, base 15 is provided with a conductive surface 62 that is in direct electrical contact with positive lead 59. Electronic network 50 is constructed so as to create an open circuit between conductive surface 62 and feeding roosts 40. Of course, a bird 12 resting on feeding roost 40 to feed will not close the circuit and can feed uninterrupted and undeterred. However, squirrel 14 must stand on the conductive surface 62 of base 15 and grasp a feeding roost 40 in order to feed. This will close the circuit, thus shocking squirrel 14.

Figure 3A:
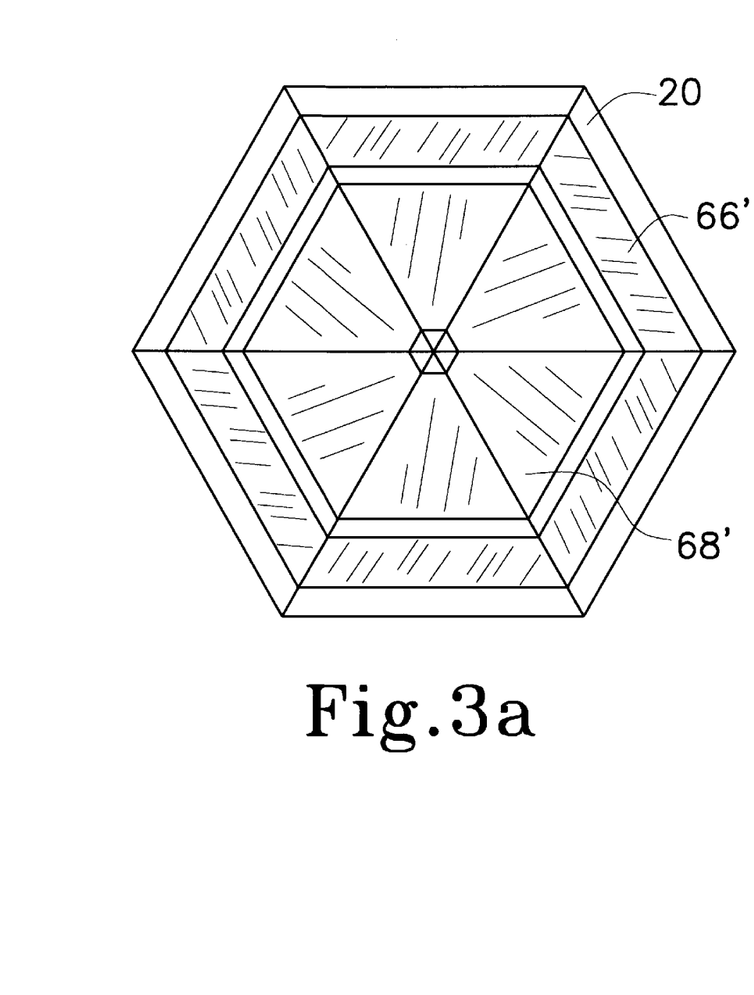
FIGS. 3a and 3b show a top view of the bird feeder top showing the conductive regions for preventing a squirrel from resting on the top of the feeder.
Figure 3B:
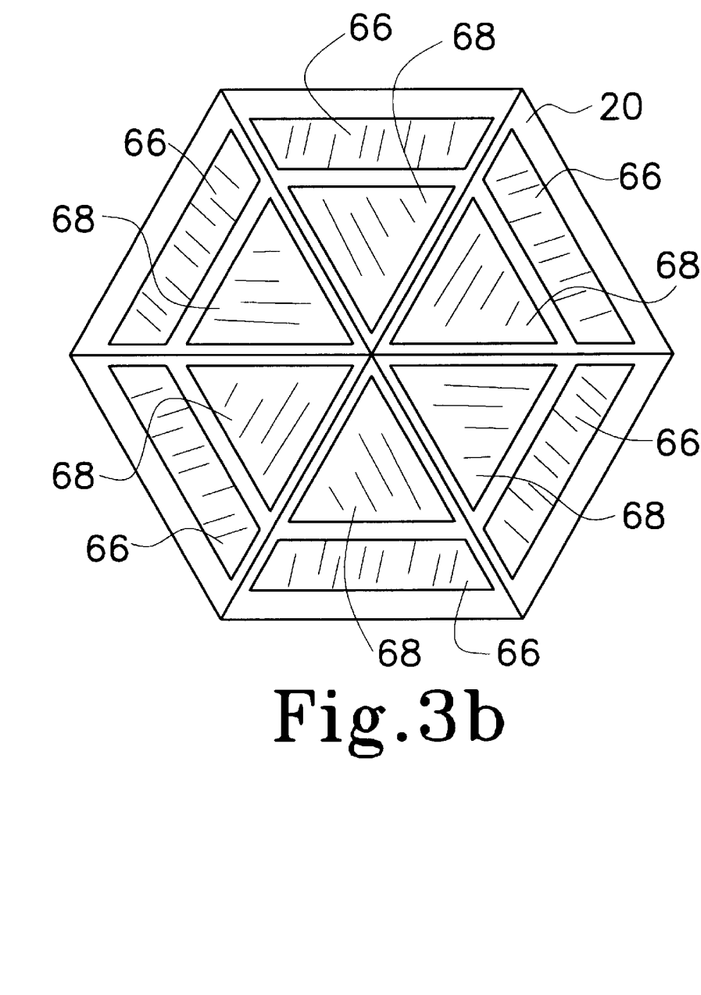

Referring to FIG. 3b, top 20 includes a plurality of conductive surfaces 66 and a plurality of conductive surfaces 68. Conductive surfaces 66 and 68 are in electrical contact with leads 59 and 60 via contacts 70 and 72 such that there is an open circuit between surfaces 66 and surfaces 68. A squirrel that attempts to rest on top 20 will close this circuit upon contacting surfaces 66 and surfaces 68 and will thereby be shocked. While a plurality of surfaces 66 and surfaces 68 are illustrated in FIG. 3b, FIG. 3a shows an alternate embodiment in which top 20 has a single, large, centrally disposed conductive surface 66' and a single, perimetrically disposed conductive surface 68' that form an open circuit. In the preferred embodiment of feeder 10, the polarity of either conductive surface 66 or 66' is positive such that an open circuit exists between surface 66 or 66' and feeding roosts 40. Thus, even if a squirrel manages to hang from the edge of top 20 it will close a circuit and be shocked upon grasping a feeding roost 40.

Figure 8:
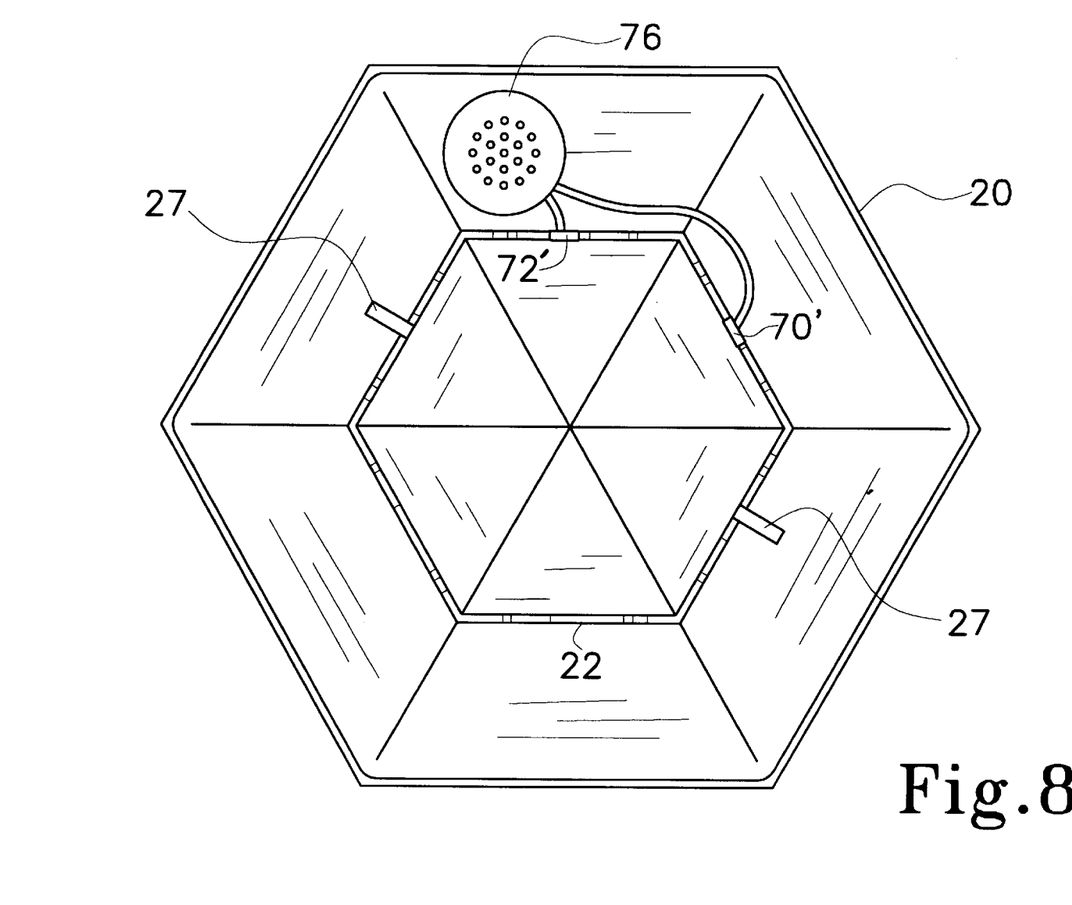
FIG. 8 is a bottom view of an alternate embodiment of the bird feeder top showing the recess for receiving the top of the bird feeder and showing the piezo sounder.
Figure 9:
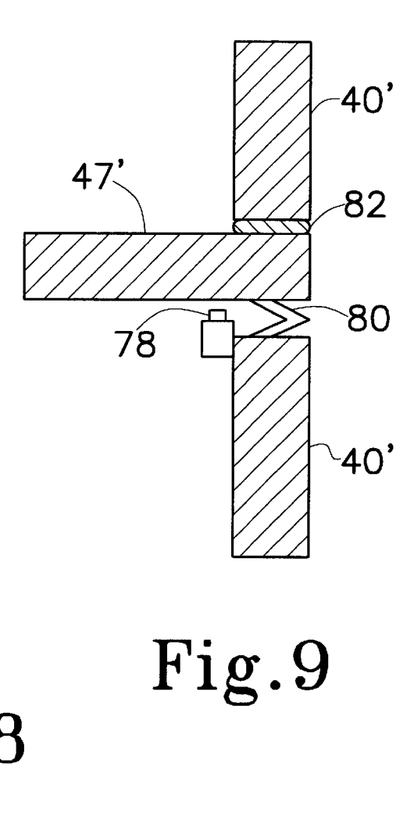
FIG. 9 is a partial cross sectional view of an alternate embodiment of the feeding roost and perch showing the spring biasing of the perch away from the contact switch.

Referring to FIGS. 7, 8 and 9, an alternate embodiment is illustrated with common components bearing the same reference numerals. Comparable but distinctive parts bear the same reference numeral with the prime notation added, and parts not previously described bear their own reference numerals. In the alternate embodiment, squirrels are deterred from foraging at the bird feeder by means of a loud ultrasonic sound in the 25 Khz range. In this regard, electronic network 50' is a conventional circuit, known to those skilled in the art, for producing an loud, ultrasonic sound in the 25 Khz range. The circuitry and the power source are preferably housed in base 15 and can be removed as a unit if in need of repair, thus allowing bird feeder 10 to remain in service should network 50' require repair. Network 50' includes a power source 52, a frequency oscillator 74, a piezo-electric sounder 76 and a squirrel-activated switch 78. Network 50' also preferably includes a manual switch 57 for deactivating network 50' and a light 58 for indicating power status to network 50'. Piezo sounder 76 is preferably mounted on the lower side of top 20. Current is delivered to piezo sounder 76 via conventional wiring which engages contacts 70' and 72'. While those skilled in the art will appreciate that squirrel-activated switch 78 can be mounted on the upper surface of base 15, a preferred configuration utilizes a spring biased perch 47'. In this regard perch 47' is pivotally received in roost 40' and is biased in the horizontal position by means of spring member 80. Spring 80 is chosen so as to maintain perch 47' in the horizontal position against the weight of a bird. However, when a squirrel places weight on perch 47', perch 47' pivots downward and engages squirrel-activated contact switch 78. In order to assist in holding perch 47' within roost 40' a compressible grommet 82 can be utilized.

From the foregoing description, it will be recognized by those skilled in the art that a bird feeder that prevents squirrels from feeding therefrom offering advantages over the prior art has been provided. Specifically, the bird feeder provides a plurality of electrodes that provide a mild, non-injuring shock to the squirrel. Additionally, the bird feeder of the present invention provides a top that includes electrodes in order to prevent the squirrel from resting on the top of the feeder. The bird feeder of the present invention will optionally accommodate birds of various sizes at different roosts and provides a hanger/handle and top adapted such that when the top is affixed to the bird feeder the handle is prevented from swivelling and when the top is lified, the handle and top swivel away from the open end so as to facilitate refilling.

While a preferred embodiment has been shown and described, it will be understood that it is not intended to limit the disclosure, but rather it is intended to cover all modifications and alternate methods falling within the spirit and the scope of the invention as defined in the appended claims.

I claim:

1. A bird feeder for feeding multiple-sized birds and for deterring squirrels from feeding therefrom, said bird feeder comprising:

a reservoir for holding bird seed, said reservoir having an upper end and a lower end, said upper end of said reservoir including a pair of oppositely disposed hole members;

a top member for sealing said upper end of said reservoir, said top member including a continuous lip member adapted so as to engage said upper end of said reservoir in a tight frictional fit and a pair of oppositely disposed hole members, said top member further having first and second conductive surface areas;

a plurality of feeding holes disposed in said reservoir for providing access to the bird feed;

a conductive feeding roost engaged with each said feeding opening, said feeding roost having a hole member in register with said feeding hole disposed therein and further having a conductive perch;

a base member disposed proximate said lower end of said reservoir, said base member having an upper conductive surface;

a handle member having a pair of elongated vertical members, each vertical member terminating in a lateral segment, wherein said vertical members extend through said hole members disposed on said top and wherein said lateral segments are received by said hole members in said reservoir; and an electrical circuit for providing a high voltage output to a plurality of positive electrodes and negative electrodes, said electrodes in conductive contact with said conductive feeding roosts, said conductive surface of said base member and said first and second conductive surface areas on said top, whereby an open circuit is formed between said conductive feeding roosts and said conductive surface on said base member and whereby an open circuit is formed between said first and second conductive surfaces on said top.

2. The bird feeder of claim 1 wherein said bird feeder further comprises a plurality of inserts adapted to be received by said openings in said conductive feeding roosts, said inserts having beak holes disposed therein, said beak holes being adapted for selectively varying access to said feed hole.

3. The bird feeder of claim 2 wherein said inserts include feed baffles adapted to allow access to bird feed of a selected size.

4. The bird feeder of claim 1 wherein said feeding roosts are in electrical contact with said negative electrodes.

5. The bird feeder of claim 1 wherein said electrical circuit is removably housed in said base member, thus allowing said bird feeder to be in use during repair of said electrical circuit.

6. The bird feeder of claim 1 wherein said inserts engage said feeding roosts in a tight, frictional engagement.

7. The bird feeder of claim 1 wherein said feeding hole includes at least one keyways and said conductive feeding roost includes a rearwardly disposed shoulder member and at least one key disposed on said shoulder such that said conductive feeding roost can be rotated to allow said key to register with said keyway and said conductive feeding roost inserted into said feeding hole and rotated into a selected position thereby rotatably locking said conductive feeding roost into said feeding hole.

8. A bird feeder for feeding multiple-sized birds and for deterring squirrels from feeding therefrom, said bird feeder comprising:

a reservoir for holding bird seed, said reservoir having an upper end and a lower end, said upper end of said reservoir including a pair of oppositely disposed hole members;

a top member for sealing said upper end of said reservoir, said top member including a continuous lip member adapted so as to engage said upper end of said reservoir in a tight frictional fit and a pair of oppositely disposed hole members, said top member further having first and second conductive surface areas;

a plurality of feeding holes disposed in said reservoir for providing access to the bird feed;

a conductive feeding roost engaged with each said feeding opening, said feeding roost having a hole member in register with said feeding hole disposed therein and further having a conductive perch;

a base member disposed proximate said lower end of said reservoir, said base member having an upper conductive surface;

a handle member having a pair of elongated vertical members, each vertical member terminating in a lateral segment, wherein said vertical members extend through said hole members disposed on said top and wherein said lateral segments are received by said hole members in said reservoir;

a plurality of inserts adapted to be received by said openings in said conductive feeding roosts, said inserts having beak holes disposed therein, said beak holes being adapted for selectively varying access to said feed hole; and an electrical circuit housed in said base member for providing a high voltage output to a plurality of positive electrodes and negative electrodes, wherein said negative electrodes are in conductive contact with said conductive feeding roosts, and second conductive surface area on said top, and wherein said positive electrodes are in conductive contact with said conductive surface of said base member and said first conductive surface area on said top, whereby an open circuit is formed between said conductive feeding roosts and said conductive surface on said base member and whereby an open circuit is formed between said first and second conductive surfaces on said top.

9. The bird feeder of claim 8 wherein said inserts include feed baffles adapted to allow access to bird feed of a selected size.

10. The bird feeder of claim 8 wherein said inserts engage said feeding roosts in a tight, frictional engagement.

11. The bird feeder of claim 8 wherein said feeding hole includes at least one keyways and said conductive feeding roost includes a rearwardly disposed shoulder member and at least one key disposed on said shoulder such that said conductive feeding roost can be rotated to allow said key to register with said keyway and said conductive feeding roost inserted into said feeding hole and rotated into a selected position thereby rotatably locking said conductive feeding roost into said feeding hole.

12. A bird feeder for feeding multiple-sized birds and for deterring squirrels from feeding therefrom, said bird feeder comprising:

a reservoir for holding bird seed, said reservoir having an upper end and a lower end, said upper end of said reservoir including a pair of oppositely disposed hole members;

a top member for sealing said upper end of said reservoir, said top member including a continuous lip member adapted so as to engage said upper end of said reservoir in a tight frictional fit and a pair of oppositely disposed hole members, said top member further having first and second conductive surface areas;

a piezo sound generating member carried by said top member;

a plurality of feeding holes disposed in said reservoir for providing access to the bird feed;

a feeding roost engaged with each said feeding opening, said feeding roost having a hole member in register with said feeding hole disposed therein and further having a perch;

a base member disposed proximate said lower end of said reservoir, said base member having an upper surface;

a handle member having a pair of elongated vertical members, each vertical member terminating in a lateral segment, wherein said vertical members extend through said hole members disposed on said top and wherein said lateral segments are received by said hole members in said reservoir;

a plurality of inserts adapted to be received by said openings in said conductive feeding roosts, said inserts having beak holes disposed therein, said beak holes being adapted for selectively varying access to said feed hole;

an electrical circuit housed in said base member for providing an electrical signal to said piezo sounder, said electrical circuit including a power source and a frequency oscillator; and a plurality of squirrel activated switches for activating said piezo sounder thereby deterring a squirrel from said bird feeder.

13. The bird feeder of claim 12 wherein said inserts include feed baffles adapted to allow access to bird feed of a selected size.

14. The bird feeder of claim 12 wherein said inserts engage said feeding roosts in a tight, frictional engagement.

15. The bird feeder of claim 12 wherein said feeding hole includes at least one keyways and said feeding roost includes a rearwardly disposed shoulder member and at least one key disposed on said shoulder such that said feeding roost can be rotated to allow said key to register with said keyway and said feeding roost inserted into said feeding hole and rotated into a selected position thereby rotatably locking said feeding roost into said feeding hole.

16. The bird feeder of claim 12 wherein said frequency oscillator and said piezo sounder are selected to produce a loud ultrasonic sound in the 25 Khz range.

17. The bird feeder of claim 12 wherein said perch is pivotally mounted in said roost and said perch is spring biased in the horizontal position and further wherein said squirrel activated switches are carried by said roost so as to be engaged by said perch as said perch pivots under a squirrel's weight.

* * * * *